(12) United States Patent
Wolff et al.

(10) Patent No.: US 11,368,219 B2
(45) Date of Patent: Jun. 21, 2022

(54) POLARIZATION DEPENDENT LOSS (PDL) COMPENSATION SYSTEMS

(71) Applicant: Raytheon Applied Signal Technology, Inc., Sunnyvale, CA (US)

(72) Inventors: Vincent Wolff, Mountain View, CA (US); Kevin Lundgreen, Fruit Heights, UT (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 0 days.

(21) Appl. No.: 17/100,583

(22) Filed: Nov. 20, 2020

(65) Prior Publication Data

US 2022/0166513 A1     May 26, 2022

(51) Int. Cl.
| | | |
|---|---|---|
| *H04B 10/00* | (2013.01) | |
| *H04B 10/2507* | (2013.01) | |
| *H04B 10/038* | (2013.01) | |
| *H04B 10/61* | (2013.01) | |
| *H04B 10/2569* | (2013.01) | |
| *G02B 6/27* | (2006.01) | |

(52) U.S. Cl.
CPC ....... *H04B 10/2572* (2013.01); *G02B 6/2793* (2013.01); *H04B 10/038* (2013.01); *H04B 10/2569* (2013.01); *H04B 10/6161* (2013.01)

(58) Field of Classification Search
CPC ............ H04B 10/2569; H04B 10/2572; H04B 10/2507; H04J 14/02; H04J 14/06
USPC ....... 398/152, 65, 79, 147, 81, 158, 159, 33, 398/38, 135, 136, 160; 385/24, 11
See application file for complete search history.

(56) References Cited

U.S. PATENT DOCUMENTS

| | | | | |
|---|---|---|---|---|
| 7,206,517 | B1 * | 4/2007 | Yu ...................... | H04B 10/2572 398/152 |
| 9,046,653 | B2 * | 6/2015 | Mandai ................. | G02B 6/272 |
| 2012/0050846 | A1 * | 3/2012 | Akasaka ............. | H01S 3/10015 359/344 |

* cited by examiner

*Primary Examiner* — Hanh Phan
(74) *Attorney, Agent, or Firm* — Locke Lord LLP; Daniel J. Fiorello; Scott D. Wofsy

(57) ABSTRACT

A polarization dependent loss (PDL) compensation device for an optical system can be configured to output a compensating PDL to at least partially cancel a PDL of the optical system. In certain embodiments, the device can include a first polarization controller configured to modify a state of polarization of an optical signal, a PDL emulator disposed upstream of the first polarization controller and configured to output the compensating PDL upstream of the first polarization controller, and a second polarization controller disposed upstream of the PDL emulator and configured to modify a state of polarization of the optical signal upstream of the PDL emulator.

18 Claims, 12 Drawing Sheets

| PDL 1 (dB) | PDL 2 (dB) | Comp OFF (dB) | Comp ON (dB) |
|---|---|---|---|
| - | - | ~-31 | - |
| 1.5 | - | ~-21.5 | ~-31 |
| 1.5 | 2.5 | ~-13 | ~-31 |

POLARIZATION DEPENDENT LOSS (PDL) COMPENSATION SYSTEMS

STATEMENT OF GOVERNMENT RIGHTS

The invention was made with Government support. The Government has certain rights in the invention.

FIELD

This disclosure relates to optical systems, e.g., polarization dependent loss compensation systems.

BACKGROUND

Polarization dependent loss (PDL) is an impairment associated with optical components and fiber links. In the context of a fiber-based Mach-Zehnder Interferometer (MZI) used for signal cancellation, PDL in the amplified leg can impose a limit on achievable cancellation performance. There are no suitable means by which to reduce or eliminate the effect of PDL, especially for systems with dual polarization.

Such conventional methods and systems have generally been considered satisfactory for their intended purpose. However, there is still a need in the art for PDL compensation systems. The present disclosure provides a solution for this need.

SUMMARY

A polarization dependent loss (PDL) compensation device for an optical system can be configured to output a compensating PDL to at least partially cancel a PDL of the optical system. In certain embodiments (e.g. compensating for PDL within an MZI), the device can include a first polarization controller configured to modify a state of polarization of an optical signal, a PDL emulator disposed upstream of the first polarization controller and configured to output the compensating PDL upstream of the first polarization controller, and a second polarization controller disposed upstream of the PDL emulator and configured to modify a state of polarization of the optical signal upstream of the PDL emulator.

The device can further include a control module configured to control the first polarization controller, the PDL emulator, and the second polarization controller to reduce PDL downstream of the first polarization controller. The control module can be configured to receive feedback of an optical output power from a pass-through leg downstream of an interference coupler and to control the first polarization controller, the PDL emulator, and the second polarization controller to reduce and/or minimize the optical output power. In certain embodiments, the control module can be configured to modify (e.g., step increase or decrease) an amount of compensating PDL output by the PDL emulator after refining settings for the second polarization controller that cause PDL cancellation.

The PDL emulator can include a polarization beam splitter (PBS) optically connected to the second polarization controller at an input side of the polarization beam splitter to split the optical signal from the second polarization controller (e.g., into two orthogonal polarizations), a bypass line optically connected to a first output of the PBS, a variable optical attenuator (VOA) optically connected to a second output of the PBS configured to create a variable PDL, and a polarization beam combiner (PBC) optically connected at a first input thereof to the bypass line and at a second input thereof to the VOA to combine optical signals therefrom to output a compensated optical signal, wherein the PBC is optically connected to the first polarization controller. The VOA can be configured to create PDL as a function of voltage, wherein the control module is configured to control voltage to the VOA, for example.

In certain embodiments, the control module can be configured to adjust the first polarization controller to match polarization rotation matrices (e.g., and/or the birefringence) of a pass-through leg and an amplified leg of an optical system, adapt the second polarization controller to optimize polarization state of the PDL emulator to reduce PDL, and further adjust the first polarization controller to correct polarization orientation at an output of the amplified leg due to a change introduced by adapting the second polarization controller. In certain embodiments, the control module can be configured to set an initial compensating PDL output amount after adjusting the first polarization controller to match the polarization rotation matrices, and adapt the first polarization controller, adapt the second polarization controller at a rate slower than that used for adapting the first polarization controller to find a polarization state that reduces the total PDL of the amplified leg, and then modify (e.g., increase) the compensating PDL output amount.

In accordance with at least one aspect of this disclosure, an interferometer system can include a pass-through leg configured to transmit a first optical signal, an amplified leg coupled to the pass-through leg to receive the first optical signal at a first end, and coupled to the pass-through leg at a second end to output a second optical signal to the pass-through leg to interfere with the first optical signal, and a polarization dependent loss (PDL) compensation device disposed on the amplified leg. The PDL compensation device can be configured to output a compensating PDL to at least partially reduce (e.g., eliminate) the impact of PDL within the interferometer system (e.g., due to PDL on the amplified leg and/or on the through leg). The PDL compensation device can be any suitable PDL compensation device disclosed herein, e.g., as described above.

In accordance with at least one aspect of this disclosure, a non-transitory computer readable medium can include computer readable instructions configured to cause a computer to perform a method, the method comprising controlling a PDL compensation device to output a compensating polarization dependent loss (PDL) to at least partially cancel the PDL of an optical system. The method further can include using power output feedback to control the PDL compensation device to increase PDL cancellation. Any other suitable method(s) and/or portions thereof (e.g., as disclosed herein) are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
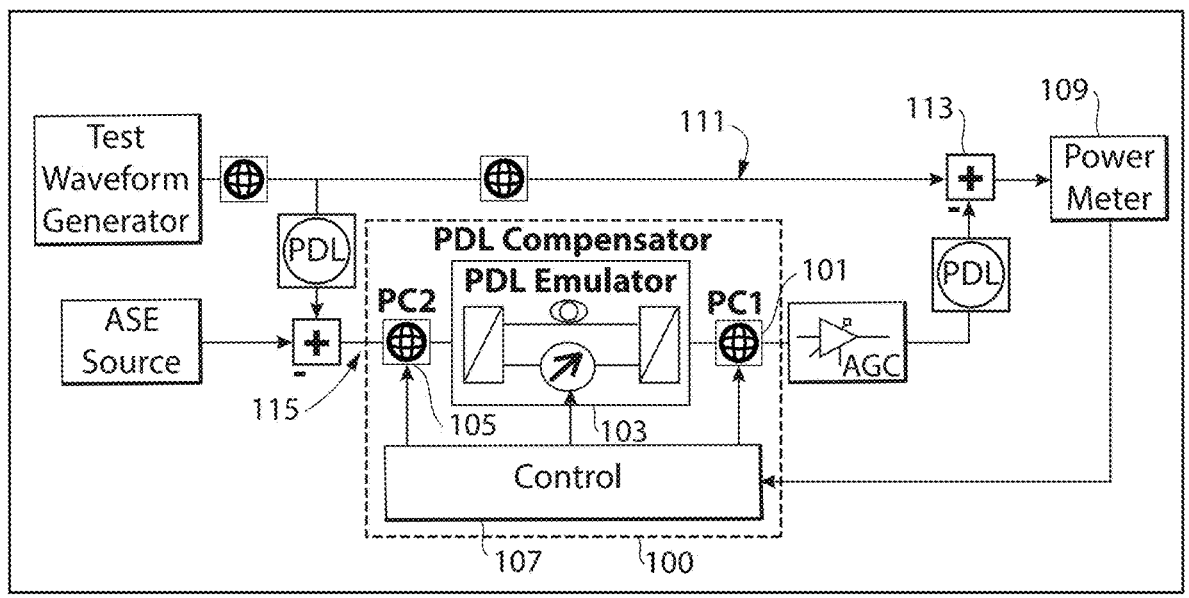
FIG. 1 is a schematic diagram showing an embodiment of a polarization dependent loss (PDL) compensation device in accordance with this disclosure, shown disposed in a schematic interferometric system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-7D. Certain embodiments described herein can be used to reduce polarization dependent loss in any suitable optical system (e.g., to increase signal cancellation in interferometry).

Referring to FIG. 1, a polarization dependent loss (PDL) compensation device 100 for an optical system (e.g., an interferometer or any other suitable optical system) can be configured to output a compensating PDL to at least partially cancel a PDL of the optical system (e.g., to reduce a power loss of at least a portion of the optical system). For example, certain embodiments can be implemented in an amplified leg of an interferometer to improve signal cancellation and thus reduce power out of the interferometer. Any other suitable use for reduction/elimination of PDL in any suitable optical system is contemplated herein.

In certain embodiments, the device 100 can include a first polarization controller 101 configured to modify a state of polarization of an optical signal (e.g., in the optical fiber that it is connected to). Any suitable type of polarization controller (e.g., mechanical, electrical, electromechanical etc.) for the first polarization controller 101 is contemplated herein (e.g., as appreciated by those having ordinary skill in the art).

The system 100 can include a PDL emulator 103 disposed upstream of the first polarization controller 101 and configured to output the compensating PDL upstream of the first polarization controller 101. The PDL emulator 103 can include any suitable components configured to add PDL to an optical system, for example.

The system 100 can include a second polarization controller 105 disposed upstream of the PDL emulator 103 and configured to modify a state of polarization (SOP) of the optical signal upstream of the PDL emulator 103. Any suitable type of polarization controller (e.g., mechanical, electrical, electromechanical etc.) for the second polarization controller 105 is contemplated herein (e.g., as appreciated by those having ordinary skill in the art). The first polarization controller 101 and the second polarization controller 105 can be the same type of polarization controller in certain embodiments.

Figure 2A:
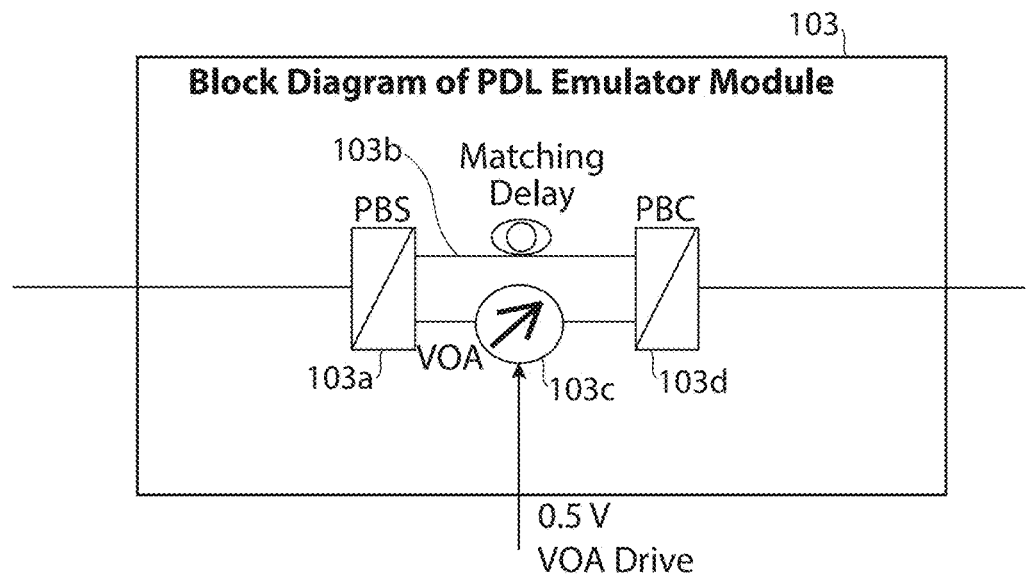
FIG. 2A is a schematic diagram of an embodiment of a polarization dependent loss (PDL) emulator module.

Referring additionally to FIG. 2A, the PDL emulator 103 can include a polarization beam splitter 103a (PBS) optically connected to the second polarization controller 105 at an input side of the polarization beam splitter 103a to split the optical signal from the second polarization controller 105 into two orthogonal polarizations. The PDL emulator 103 can include a bypass line 103b optically connected to a first output of the PBS 103a.

Figure 2B:
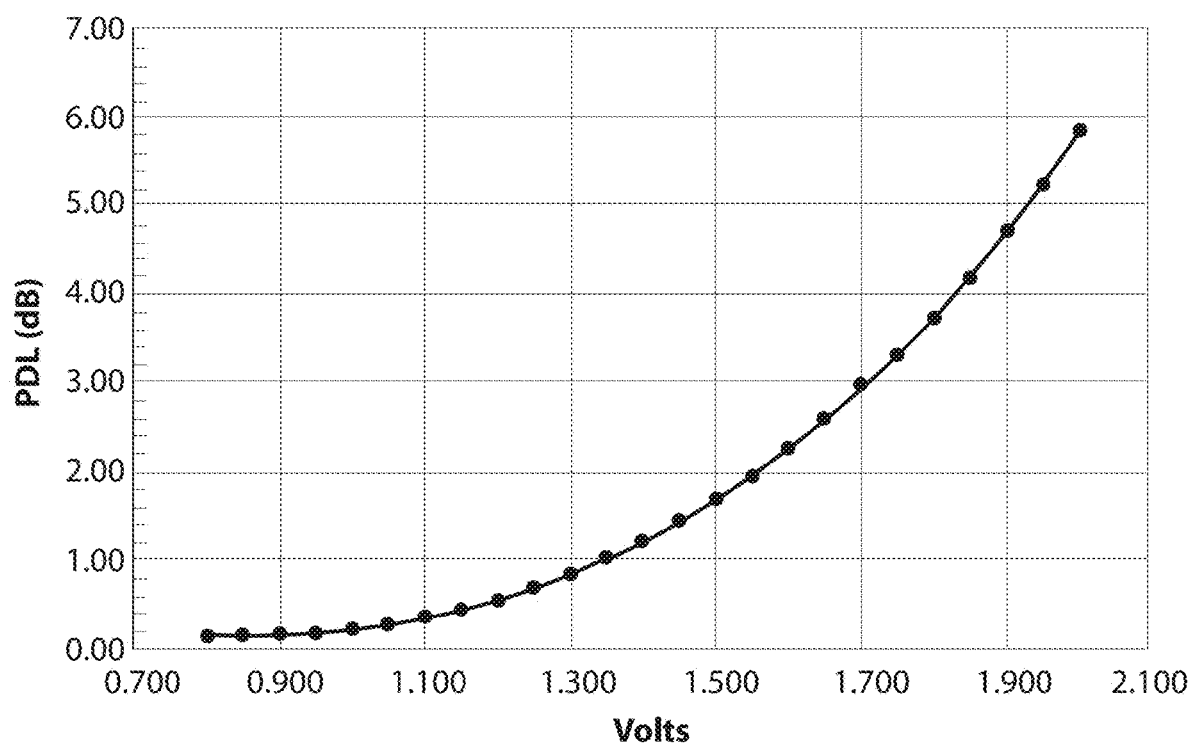
FIG. 2B is a chart showing an example correlation of voltage to PDL of an embodiment of a variable optical attenuator (VOA) for the embodiment of FIG. 2A.

The PDL emulator 103 can include a variable optical attenuator (VOA) 103c optically connected to a second output of the PBS 103a, e.g., as shown, and configured to create a variable PDL. Any suitable VOA (e.g., electrically driven as shown) is contemplated herein, e.g., as appreciated by those having ordinary skill in the art. An embodiment of a correlation between voltage applied and PDL caused by the VOA is shown in FIG. 2B. The bypass line 103b can be delay matched with the line having the VOA.

The PDL emulator 103 can include a polarization beam combiner (PBC) 103d optically connected at a first input thereof to the bypass line 103b and at a second input thereof to the VOA 103c to combine optical signals therefrom to output a compensated optical signal. The PBC 103d can be optically connected to the first polarization controller 101, e.g., such that the first polarization controller 101 receives the compensated optical signal to modify the polarization state of the PDL compensated optical signal (e.g., to minimize output power of an interferometer).

The device 100 can further include a control module 107 configured to control the first polarization controller 101, the PDL emulator 103, and the second polarization controller 105 to reduce PDL downstream of the first polarization controller 101, for example, to reduce PDL in a leg of an optical system (e.g., an amplified/cancelling leg of an interferometer). The control module 107 can include any suitable computer hardware and/or software module(s) configured to perform any suitable function and/or method disclosed herein or otherwise, for example.

The VOA 103*c* can be configured to output compensating PDL as a function of voltage. The control module can be configured to control voltage to the VOA 103*c*, for example.

In certain embodiments, the control module 107 can be configured to receive feedback of an optical output power (e.g., from an optical power meter 109) downstream of a second coupler 113 (e.g., a closing coupler downstream of an opening coupler) and to control the first polarization controller 101, the PDL emulator 103, and the second polarization controller 105 to reduce and/or minimize the optical output power (e.g., which correlates to reduced or eliminated PDL). For example, the control module 117 can be configured to use the second polarization controller 105 to rotate the SOP at the input to the PDL emulator 103 to align the net PDL vector with the PBS.

Figure 4A:
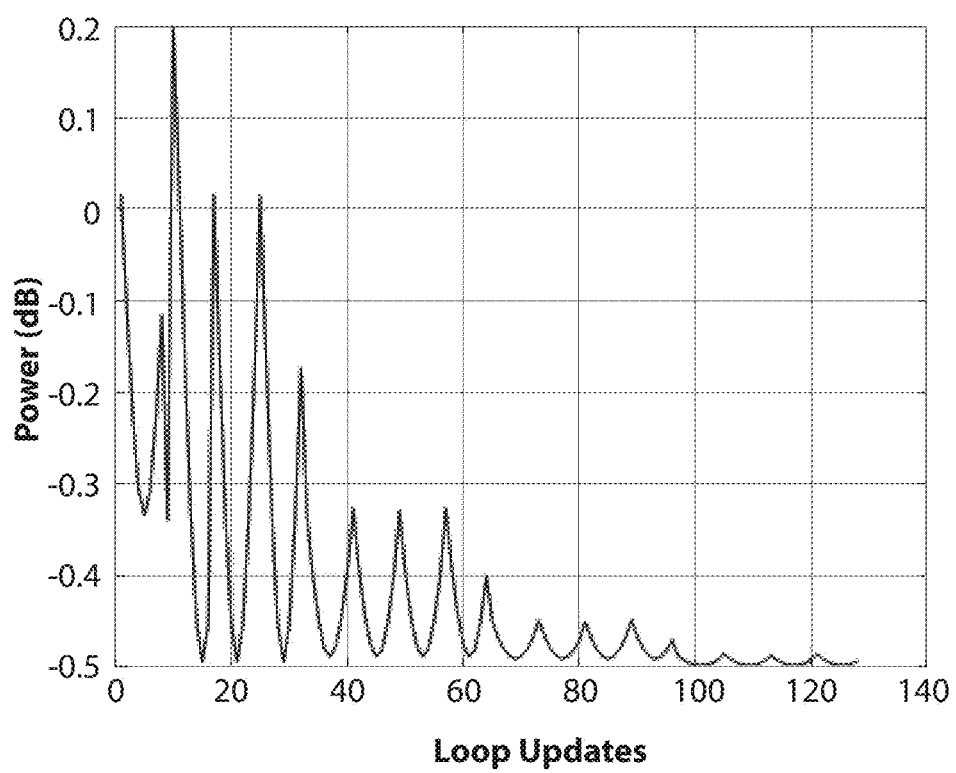
FIG. 4A is a chart showing an embodiment of output interferometer power during an initial low power search.
Figure 4B:
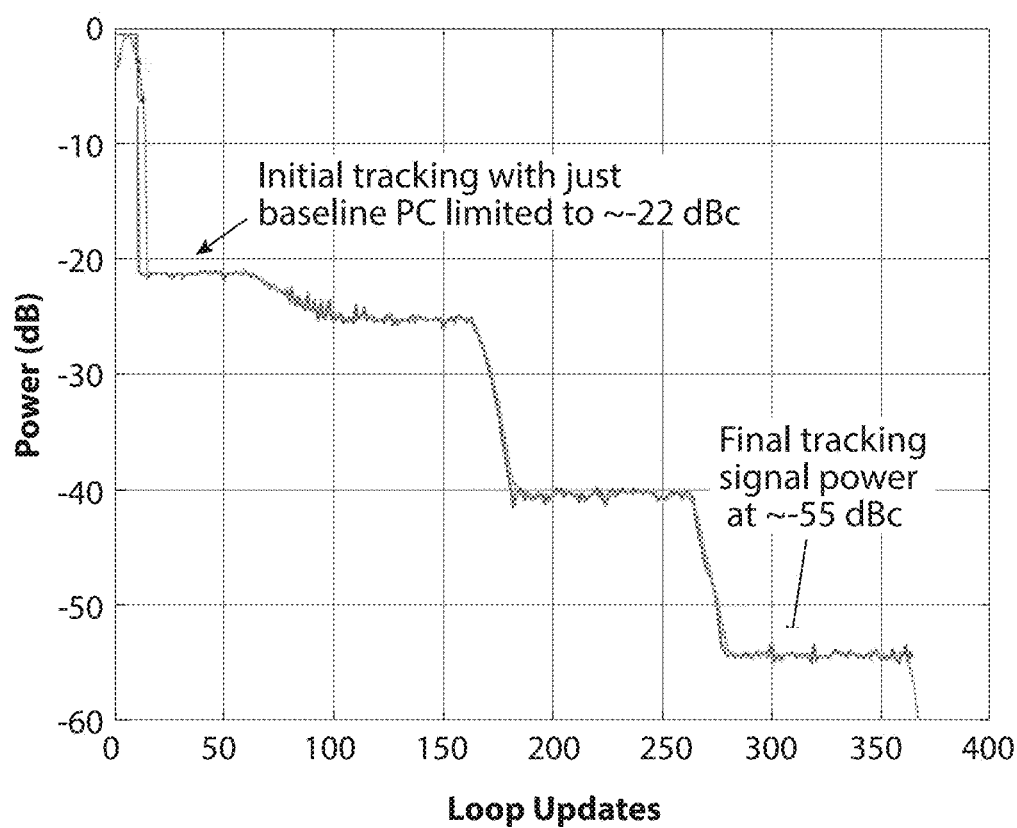
FIG. 4B is a chart showing an embodiment of output interferometer power as a function of time, showing progressively improving signal cancellation using an embodiment of this disclosure.
Figure 5:
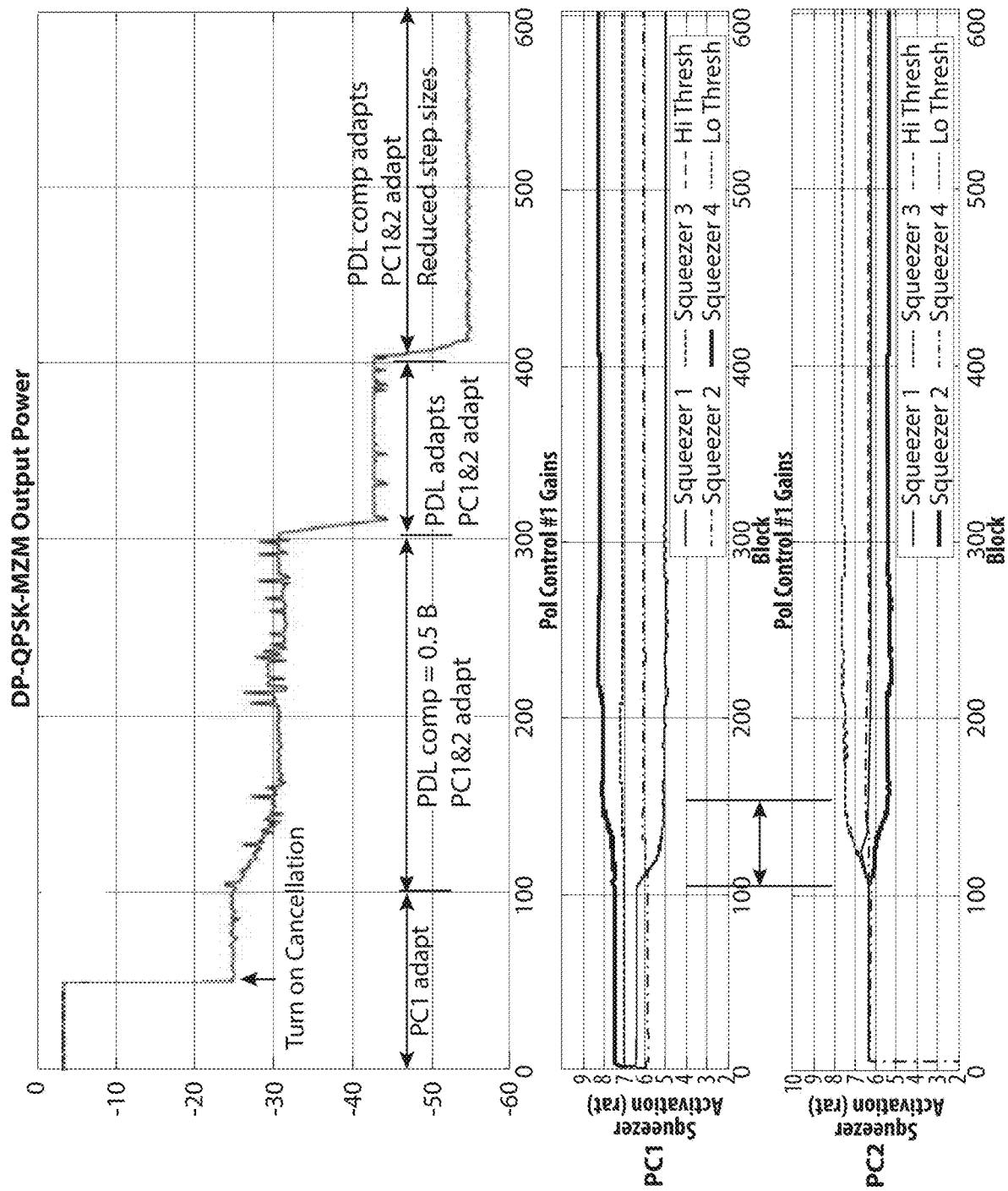
FIG. 5 shows a chart of an embodiment of output interferometer power as a function of time and in time aligned relation to controller charts showing control inputs to a first polarization controller (e.g., PC1) and a second polarization controller (e.g., PC2), both of which are modeled as fiber squeezer based polarization controllers, wherein each controller chart is shown having plotted squeezer actuation values for four independent squeezers.

In certain embodiments (e.g., as shown in FIGS. 4A-5), the control module 107 can be configured to modify (e.g., step increase or decrease) an amount of compensating PDL output by the PDL emulator 103 after refining settings for the second polarization controller 105 and/or the first polarization controller 101 that cause PDL cancellation in the optical system. The control module 107 can be configured to repeat refining the settings of the first and second polarization controllers 101, 105, followed by increasing the amount of compensating PDL until PDL is minimized or to any suitable limit (e.g., to below a suitable reduction in output power of an interferometer).

In certain embodiments, the control module 107 can be configured to adjust the first polarization controller 101 to match polarization rotation matrices of a pass-through leg 111 and an amplified leg 115 of the optical system (e.g., an interferometer as shown), adapt the second polarization controller 105 to optimize polarization state of the PDL emulator 103 to reduce PDL, and further adjust the first polarization controller 101 to correct polarization orientation at an output of the amplified leg 115 due to a change introduced by adapting the second polarization controller 105. In certain embodiments, the control module 107 can be configured to set an initial compensating PDL output amount after adjusting the first polarization controller 101 to match the polarization rotation matrices of the two legs 111, 115, and then continue adapting the first polarization controller 101. The control module 107 can also adapt the second polarization controller 105 at a rate slower than that used for adapting the first polarization controller 101 to find a polarization state that reduces the total PDL of the optical system (e.g., the amplified leg), and then modify (e.g., increase) the compensating PDL output amount.

In certain embodiments, an initial directed search of the second polarization controller 105 can be performed to find settings that are relatively close to the correct values. Then the second polarization controller 105 can perform slower tracking with smaller steps. For example, a directed search can be enabled by stepping through successively smaller ranges of rotations. Each step can be a slow ramp so the first polarization controller 101 can keep up with the changes. Certain embodiments can be configured to optimize the ordering of these steps to minimize the total movement (and search time), for example.

In certain embodiments, the system 100 can include an optical power meter 109 connected to the control module 107 and configured to sense optical power. The power meter 109 can include any suitable components to sense and/or indicate optical power and be operatively connected to the control module 107 (e.g., which can receive and/or interpret the signals from the power meter 109, and/or form part of the power meter 109). The optical signal can be first filtered so that only the channel to be cancelled is observed (e.g., ignoring all the other DWDM channels). Then, power can be measured with a photoreceiver and converted via an A/D converter which can be part of the controller 107. Any other suitable components for the system 100 are contemplated herein. Any suitable optical pathway between any suitable components is contemplated herein (e.g., optical fiber connected to each component).

In accordance with at least one aspect of this disclosure, an interferometer system 300 can include a pass-through leg 111 configured to transmit a first optical signal. The system 300 can include an amplified leg 115 coupled to the pass-through leg 111 (e.g., at a first coupler 117) to receive the first optical signal at a first end, and coupled to the pass-through leg 111 at a second end (e.g., at a second coupler 113) to output a second optical signal to the pass-through leg 111 to interfere with the first optical signal. The system 300 can include a polarization dependent loss (PDL) compensation device, e.g., device 100, disposed on the amplified leg 115. The PDL compensation device can be configured to output a compensating PDL to at least partially (e.g., completely) cancel a PDL of the interferometer system 300 (e.g., due to components on the amplified leg 115) to allow improved interference. The PDL compensation device can be any suitable PDL compensation device disclosed herein, e.g., as described above.

Figure 3:
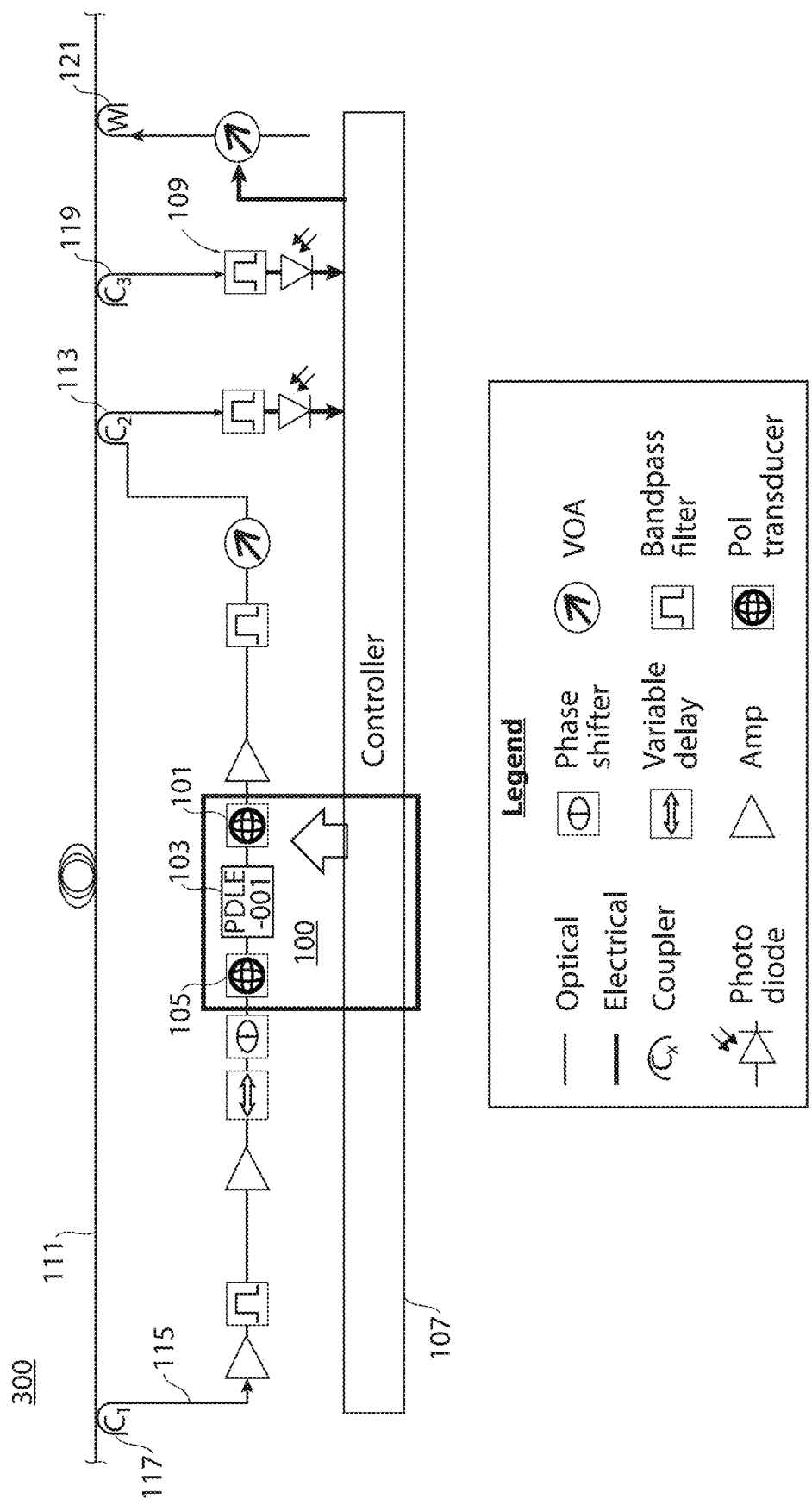
FIG. 3 is a schematic view of an embodiment of an interferometer in accordance with this disclosure, e.g., for use in add-drop multiplexing.

The system 300 can include any other suitable components (e.g., as shown in FIG. 3) configured to cause suitable optical signal interference as appreciated by those having ordinary skill in the art in view of this disclosure (e.g., a phase shifter to offset a phase to allow interference, one or more amplifiers, one or more bandpass filters, one or more additional VOAs, etc.).

For example, system 300 can include one or more amplifiers (e.g., three as shown in the positions shown) that can provide high gain to overcome coupling and component losses. The system can include a tunable filter that can extract a desired channel from a dense wavelength division multiplexing (DWDM) band, a coarse delay that can tune overall delay to closely match the two legs. The system 300 can include a phase shifter to finely tune and track optical phase. The system 300 can include an additional VOA on the amplified leg 115 to act as both a gate to turn cancellation on and off and to also fine tune power for matching at the second coupler 113.

In certain embodiments, as shown, the output of the amplified leg 115 can be coupled to the pass-through leg 111 at a second coupler 119 (e.g., a closing coupler) whose secondary output is fed back as a monitor point to the control module 107. Additionally, another monitoring point may be provided as feedback to the controller 107 via the secondary output of a third coupler 119 (e.g., a monitoring coupler) located downstream of the second coupler 113 (e.g., for signal power measurement). Alternatively or additionally, power can be monitored from the secondary output of the second coupler 113. In such a case, when power on the main line is minimized, it can all flow out of this port such that the algorithm has to maximize power monitored.

In certain embodiments, the system 300 can be used for add-drop multiplexing. For example, an add leg 123 can be included in the system 300 at a fourth coupler 121 (e.g., for adding a new signal to replace the cancelled signal). The add leg 123 can include another VOA as shown, e.g., as a gate for the added signal. As shown, the control module 107 can be configured to output the new signal (e.g., in the same frequency or band as the cancelled signal).

In accordance with at least one aspect of this disclosure, a non-transitory computer readable medium can include computer readable instructions configured to cause a computer to perform a method, the method comprising controlling a PDL compensation device to output a compensating polarization dependent loss (PDL) to at least partially cancel a PDL of an optical system. The method further can include using power output feedback to control the PDL compensation device to increase PDL cancellation. The method can include controlling one or more of the components of the system 100 to result in reduced PDL and/or power output. Any other suitable method(s) and/or portions thereof (e.g., as disclosed herein) are contemplated herein. In certain embodiments, the control module 107 can perform any suitable embodiment of a method disclosed herein, e.g., as described above.

FIG. 4A is a chart showing an embodiment of output interferometer power during an initial low power search (e.g., the first and/or second polarization module is iterated to find an initial low power setting range). FIG. 4B shows an embodiment of results of power output of an interferometer of FIG. 3, for example, as well as control inputs to the polarization controllers in FIG. 5. As shown in FIG. 5, first, the first polarization controller 101 (e.g., PC1) finds a state that matches polarization rotation matrices of the amplified leg and through leg. Then, the second polarization controller 105 (e.g., PC2) adapts to optimize the polarization angle of the PDL compensator. PC1 responds to correct the polarization orientation at its output. The charts of FIGS. 4A-5 show an improvement in signal cancellation over time as the controller progresses through its stages: first finding the correct polarization setting, then finding and refining settings to optimize cancellation of PDL. Embodiments search for settings to progressively improve cancellation of PDL.

As can be seen, when PDL compensation is turned on, the controller 107 can be configured to change settings of the first polarization controller 101 and the second polarization controller 105 (either contemporaneously or successively) while searching for settings that cause a reduction in output power of the interferometer (which corresponds to reduced PDL in the amplified leg, thereby providing a better match to the signal on the through leg) and at an initial, low compensating PDL output power (e.g., 0.5 dB). After suitable settings have been found, the amount of PDL from the PDL emulator can be increased (e.g., voltage to the VOA can be increased) to increase an amount of compensating PDL (which presents graphically as the step down in output power). This process can be repeated (e.g., with finer iterations used for the second polarization controller 105 after each step down). The first polarization controller 101 can include a constant iteration rate (or any other suitable iteration rate) and can be allowed to have multiple iterations after each iteration of the second polarization controller 105 and/or larger adaptation step sizes than the second polarization controller 105.

In certain embodiments, for example, if PDL compensation is turned on (e.g., output power level is too high), the control module 107 can turn on the VOA in the PDL emulator and create a small amount of PDL assuming it can reduce net PDL. At this point, the control module 107 can iteratively sweep the second polarization controller 105 over a large range to find a region of settings where output power is reduced to a minimum. In certain embodiments, every time an iteration is made with the second polarization controller 105, the first polarization controller 101 is adapted to a new setting. For example, if the second polarization controller 105 is rotated (as in Poincare plot rotation) by 10 degrees, then the first polarization controller 101 must rotate to account for that rotation. For this reason, the method used to search for the correct setting of the second polarization controller is critical to having the whole system converge. For example, rather than taking instantaneous steps to new settings, the controller can move to new settings with slow ramps so that the first polarization controller can follow along. The controller can also optimize the ordering of its search parameters to minimize the overall search time. In certain embodiments, the first polarization controller 101 can be continuously iterated to find the minimum power output, and thus be directly and constantly controlled as a function of the feedback, whereas second polarization controller 105 can be controlled in a fixed manner prescribed by the control module 107 to look for settings where the PDL is being cancelled. The control module 107 can wait for the first polarization controller 101 to adapt to a minimum power output setting or range before iterating the second polarization controller 105. The way that the first polarization controller 101 can be iterated may remain unchanged, but the second polarization controller 105 may reduce its iterative step size after finding a setting range where a power minimum is located in order to progressively fine tune. Thus, the second polarization controller 105 may continually iterate but it can be progressively more slowly and/or more finely tuned.

Once the right settings are found for the second polarization controller 105, the attenuator can be adjusted to increase the amount of emulated PDL. For example, in an initial search phase, a smaller compensating PDL (e.g., 0.5 dB) can be applied, and then gradually made larger (e.g., 2.5 dB) as the settings improve. In certain embodiments, steady state compensating PDL can be the same magnitude (but opposite direction) as the net PDL from the components in the system. While one or more certain control schemes are disclosed above and herein, any other suitable control scheme to result in reduced PDL using any suitable embodiment disclosed herein is contemplated herein.

An embodiment of an initial default polarization tracking method (with PDL compensation disabled) is now described with the polarization controllers having four actuator rails. For example, before enabling cancellation, a POL search can be done by leaking a small amount of power back into the closing coupler and using PC1 to find ideal initial conditions. The search can be performed by cycling the PC1 rails through many different combinations. Initially, each rail can be stepped by relatively large steps. Once the best combination of values is found, the process repeats with progressively smaller steps. After a configurable number of iterations, the search can be complete.

Once cancellation is enabled, real-time tracking of PC1 can begin and PC2 can remain static with its initial settings. Each of the four control inputs of PC1 can be adjusted one at a time in a round-robin fashion to the following three values:

SET_POINT+STEP
SET_POINT
SET_POINT−STEP

At each of the three steps, the control value can be held for a configurable time period. The power from the photoreceiver ADC can be accumulated for the duration of each step. Once all three measurements are available, the SET_POINT can be updated based on the lowest measured power.

Figure 5A:
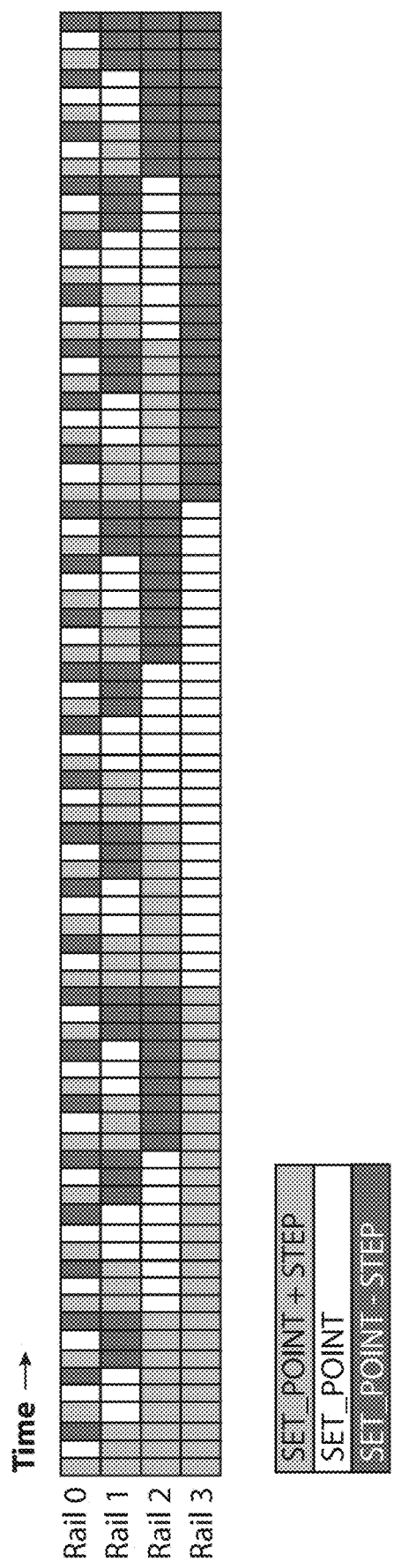
FIG. 5A shows an example of rail control inputs in accordance with this disclosure.

An embodiment of PDL tracking is now described. For example, when PDL compensation is enabled, PC1 and PC2 can be handled separately. In "steady state", PC1 can be used in the traditional method for tracking polarization. When PDL compensation is first enabled, the following steps can occur:

1. A small amount of PDL is set in the PDL emulator.
2. Once the PDL is set, PC2 does a search over a wide range of settings. This search can be done in the same way that PC1 does an initial search before enabling cancellation, with the difference that PC2 control settings are not allowed to change instantaneously. Instead, they move very slowly to the new search setting, allowing for the faster-tracking PC1 to compensate for these changes. This makes the PC2 polarization search very slow compared to PC1 initialization. FIG. 5A shows an example of rail control during the search phase for one or more of the polarization controllers. In this example of a search iteration, three control values are tested for each of the four rails, so it takes $3^4$ (=81) cycles to complete the iteration.
3. The amount of PDL is then cycled through three different levels (SET_POINT+STEP, SET_POINT, SET_POINT−STEP). Of the three values tested, the one corresponding to lowest power is used as the new SET_POINT.
4. Each time the amount of PDL changes, the state of PC2 is allowed to adapt. This can be done by tracking each PC2 rail individually, in the same manner the PDL is tracked. This process continues for several iterations.
5. Repeat steps 3-4, with progressively smaller step sizes. As disclosed above, in certain embodiments, the same initial polarization search algorithm can apply to both PC1 (before enabling cancellation), and to PC2 (to begin PDL compensation). The only difference between these two cases can be that the PC1 search is much faster. When changing levels, the PC1 rails can change instantaneously. In certain embodiments, when the PC2 rails change levels, they do so very slowly, in a ramp, for example. The reason for this slow ramp can be to allow PC1 to adapt as PC2 changes, preventing unwanted performance degradation, for example. The PC2 search could be made more efficient (and consequently faster) by optimizing the order of the values searched.

Figure 6A:
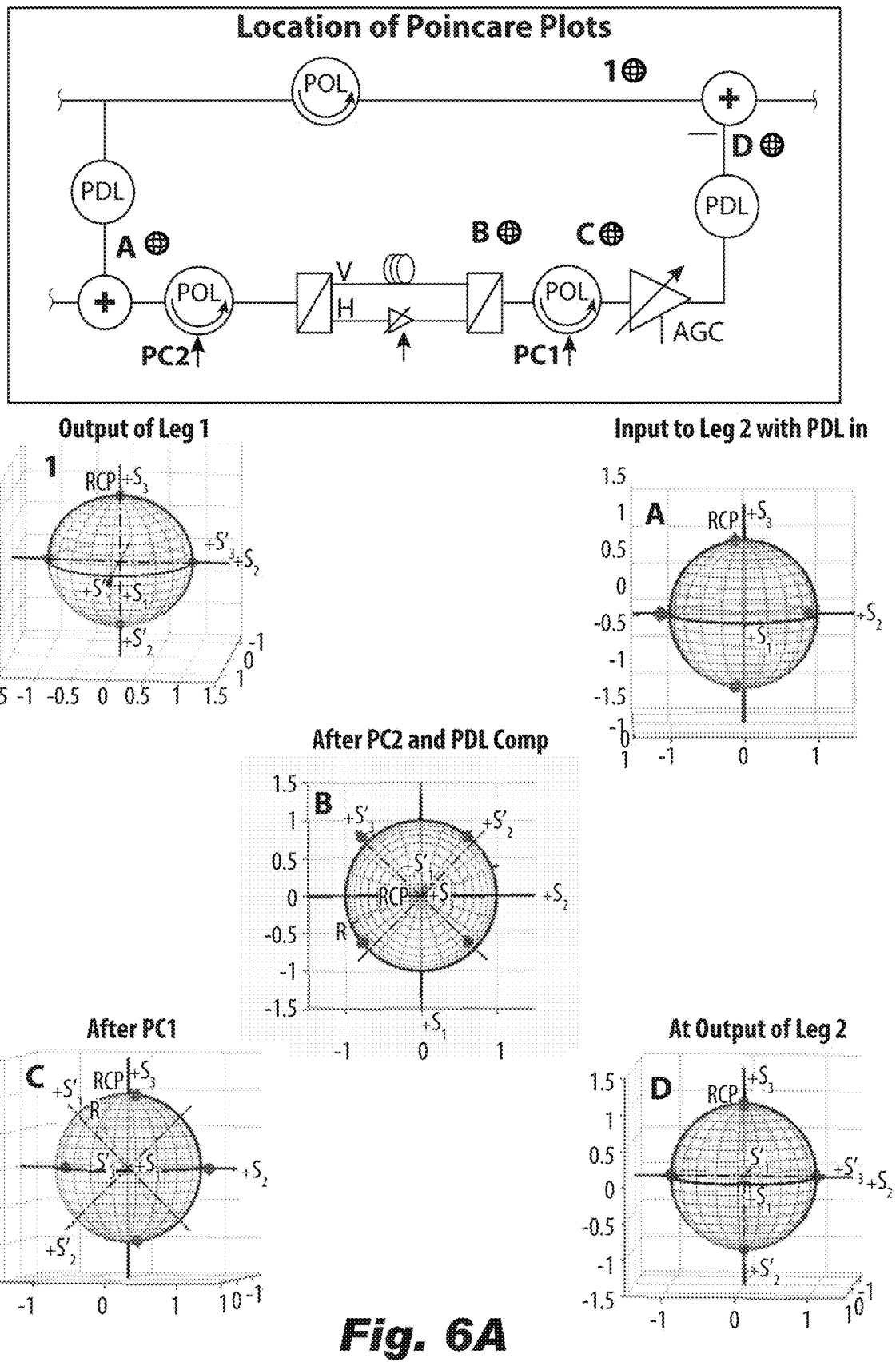
FIG. 6A shows a graphical representation of states of polarization (SOP) using Poincare plots at different points in a system, e.g., as shown in FIG. 1.
Figure 6B:
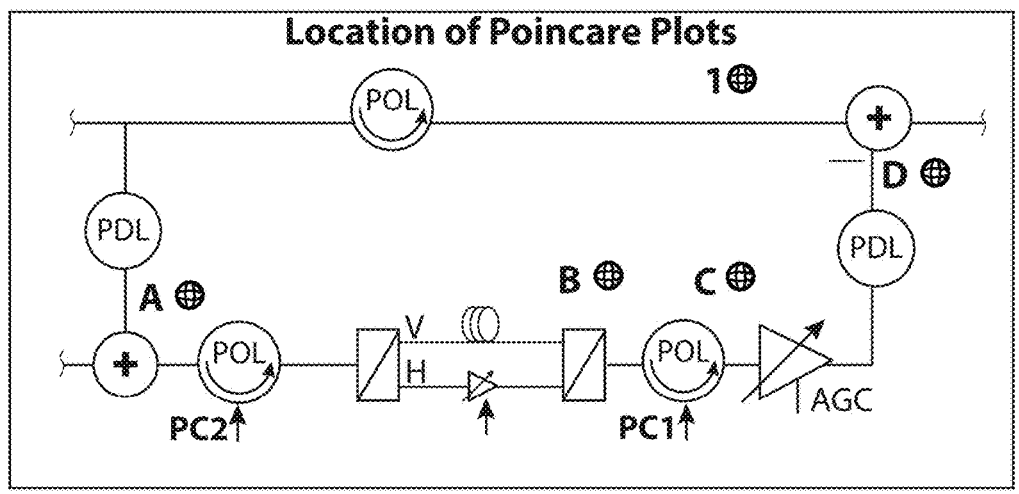
FIG. 6B shows a graphical representation of states of polarization (SOP) using Poincare plots at different points in a system, e.g., as shown in FIG. 1, shown with more complicated angles for PDL and SOP rotation on the through-leg than those of FIG. 6A.
Figure 6B:
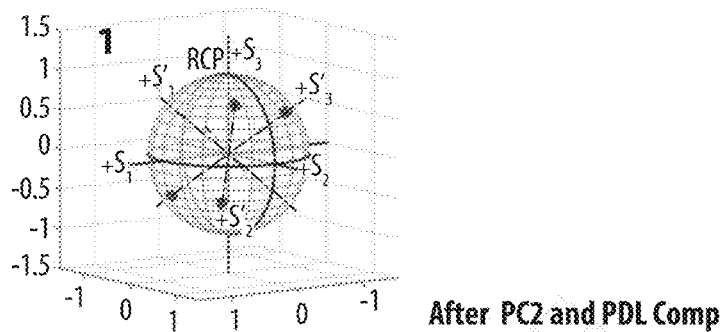
Figure 6B:
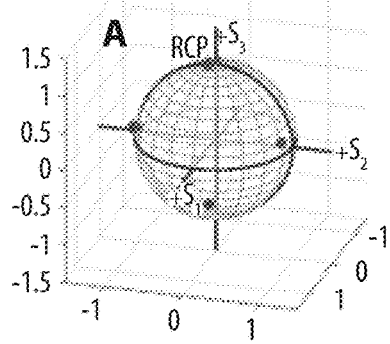
Figure 6B:
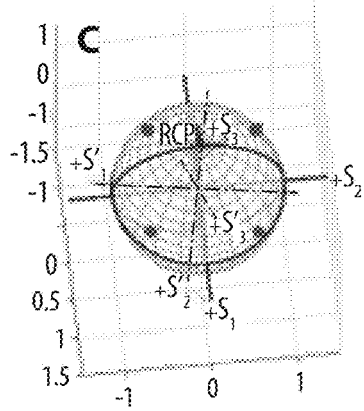
Figure 6B:
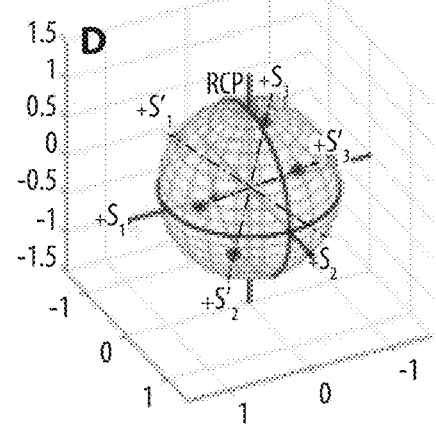

Referring now to FIGS. 6A and 6B, the FIGS. show a graphical representation of states of polarization (SOP) and PDL using a variant of Poincare plots at different points in a system. These plots demonstrate how the SOP and PDL change as the signal transits the system when PDL compensation is in effect. Each polarization controller causes an SOP rotation about some axis. The figures show two sets of coordinate axis to depict the orientation both prior to rotation (labeled $S'_1$, $S'_2$, $S'_3$) and post rotation (labeled $S_1$, $S_2$, $S_3$) and the dashed line shows an axis of rotation.

For example, as shown in FIG. 6A, the pass-through leg (leg 1) rotates by pi/2 about the S1 axis (so that points at S3 on the input appear at S2 on the output), the amplified leg (leg 2) input and output PDL are both 1 dB aligned with the local S2 axis, so the composite PDL at the output of leg 2 is at pi/4 elevation (halfway between S2 and S3). The PDL correction can be applied along the local S1 axis, so the second polarization controller (e.g., PC2) aligns the composite PDL with −S1, the PDL compensator adapts the value to optimize the output, and the first polarization controller (PC1) aligns the polarization with the pass-through leg. A second example is shown in FIG. 6B with a more complicated angle of rotation (e.g., PDL of 1 dB at input and output at arbitrary SOPs, and a pass-through leg rotation of 60 deg about an arbitrary SOP axis. The data shows that even in more complex scenarios, embodiments can still acquire and track changing polarization and PDL to cancel PDL.

FIGS. 7A-7D show an experimental set up and experimental results. Referring to FIGS. 7A-7D, a PDL compensation lab test was conducted. Two PDL devices and compensating fiber delays were used to mimic PDL at different locations within the amplified leg. Extremely large PDL values were chosen for the test. Tests were performed using a DP-QPSK source at close to 0 dBm input, where the tested system performs best. Baseline cancellation performance (no PDL) showed output power ranging from −29 dBm to −31 dBm, depending on control loop tracking parameters.

The test first measured initial cancellation with compensation off. Then, compensation was turned on and final cancellation compared with the baseline case. The lab results showed that the PDL compensation scheme worked perfectly, completely eliminating the detrimental effects of PDL. Plots show real-time FPGA captures of cancelled power and control parameters. Initially, the first polarization controller is converged and cancellation is limited (Pout of about −17 dBm). The second polarization controller searches, then the second polarization controller and PDL emulator start adapting after about 0.5 minute. Adaptation may be slow because the first polarization controller is allowed to respond to any changes made by the second polarization controller. Cancellation improves as polarization controllers and PDL emulator continue to adapt.

Embodiments can acquire a proper compensation state by controlling the first polarization controller 101 to search for a desired setting, turning on PDL compensation, adapting the first polarization controller 101, setting an initial PDL compensation amount, adapting the first polarization controller 101, performing a slow, directed search with the second polarization controller 105, then while continuing to adapt the first polarization controller 101, adapting the PDL compensation amount and the second polarization controller 105 slowly, then reducing step sizes and continuing to adapt all above.

Certain embodiments can be used with add-drop multiplexers that can take a portion of an optical signal, select a wavelength/channel to remove, generate an output at another coupler that is 180 degrees out of phase with the original signal to cancel the selected channel, and then output a new signal on the cancelled channel. Embodiments can allow for efficient use of all channels where one is no longer needed, for example. Embodiments can have applicability to any other suitable optical system for any other suitable use (e.g., optical signal processing networks).

Embodiments can include a PDL compensator that can include a second polarization controller and a PDL emulator. The PDL emulator can have a polarizing beam splitter (PBS), two matched paths (one with a variable attenuator) and a polarizing combiner. The second polarization controller (PC2) can rotate SOP at an input to the PDL emulator to align the PBS and the net PDL vector. The PDL compensator can adjust to minimize net PDL. The first polarization controller can rotate so that the two legs are birefringence matched at the second coupler 113.

Figure 7A:
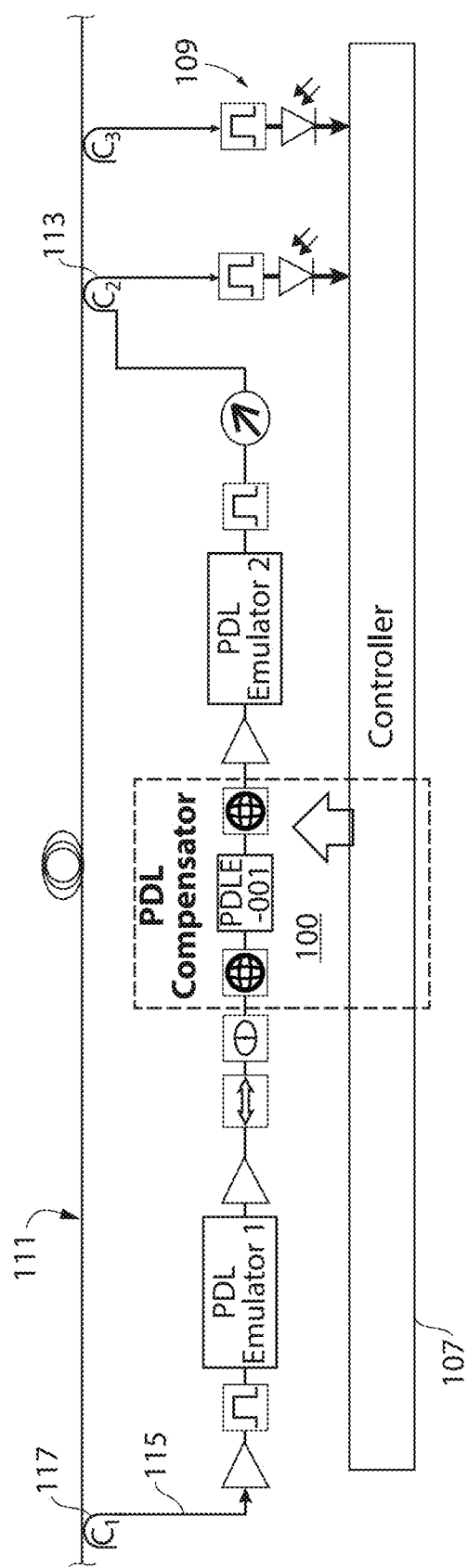
FIG. 7A shows an embodiment of an experimental set up of an embodiment of an interferometer in accordance with this disclosure.
Figures 7B, 7C:
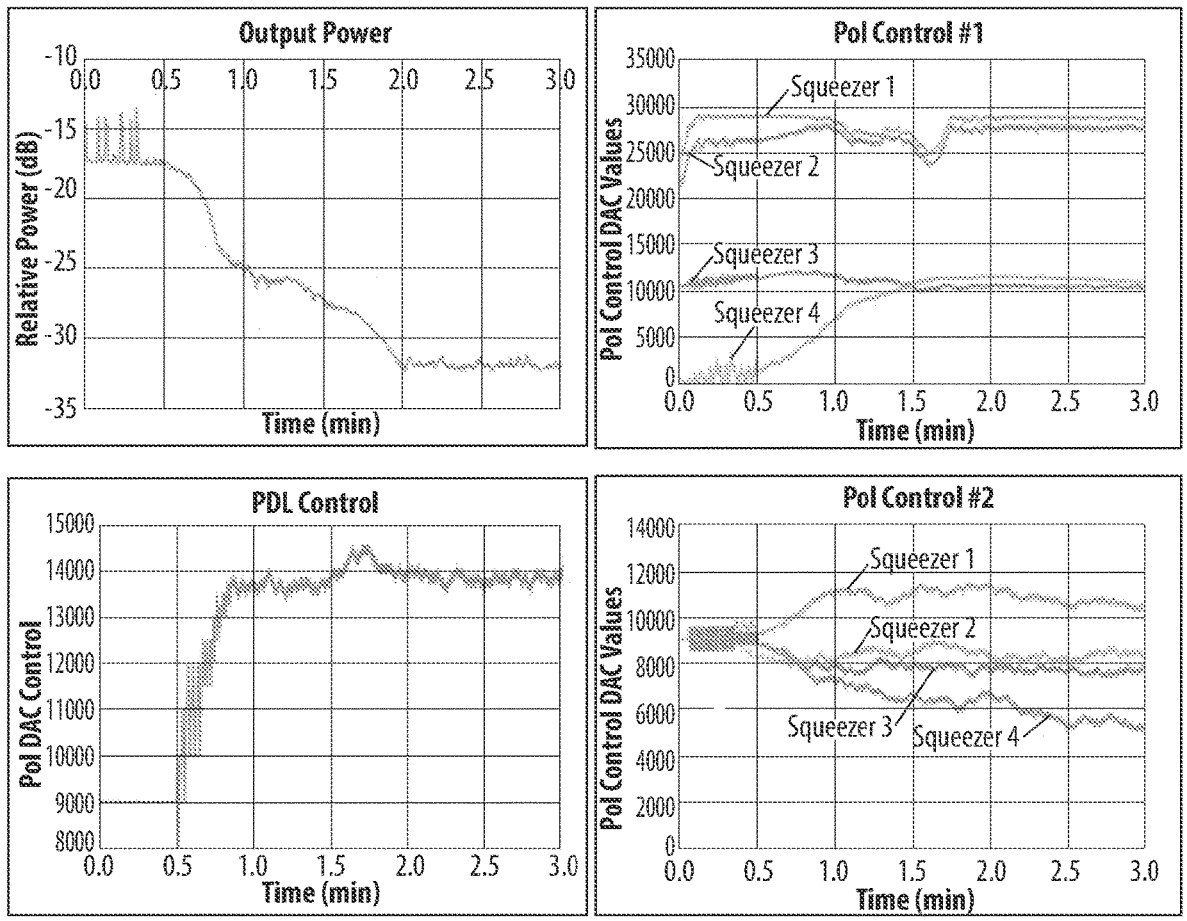
FIG. 7B shows charts showing experimental results of output signal power, compensating PDL control, and polarization controller inputs of the embodiment of FIG. 7A.
FIG. 7C shows resulting signal cancellation power values (and thus PDL compensation) for the embodiment of FIG. 7A controlled in accordance with FIG. 7B.
Figure 7D:
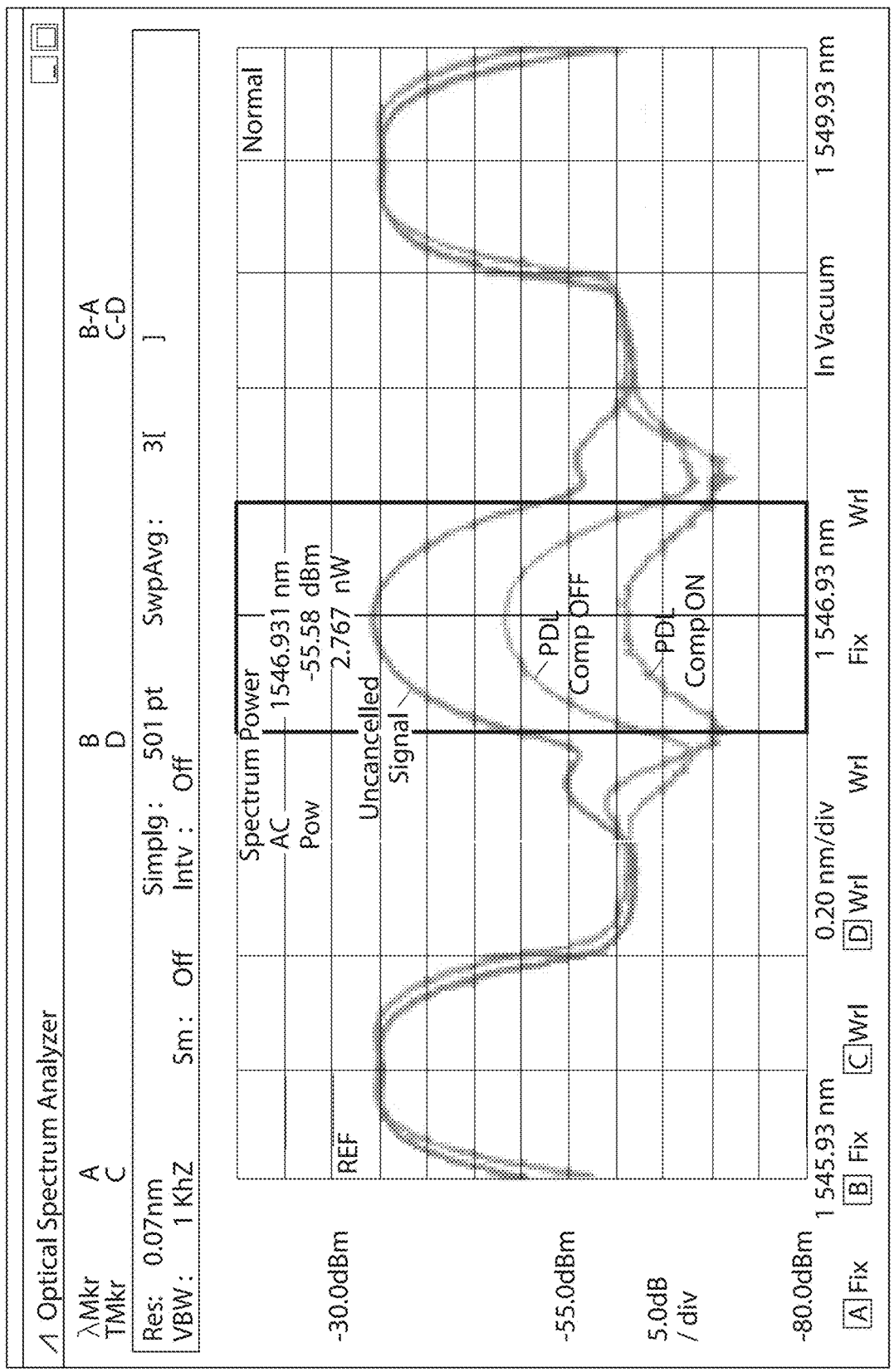
FIG. 7D shows optical spectrum analyzer plots of signal cancellation using the system of FIG. 7A, the traces showing an uncancelled signal, an uncompensated cancelled signal with PDL, and a PDL compensated cancelled signal relative to each other.

Example simulations have shown that with 1 dB PDL at input and output (e.g., at the positions shown in FIG. 1), traditional systems utilizing a single polarization controller (e.g., only the first polarization controller 101) were limited to a cancellation of 22 dB. Simulation and experimental data have shown that PDL impact can be completely eliminated with embodiments of this disclosure, e.g., as shown in FIGS. 7A-7D. High cancellation (>30 dB) was achieved even with extreme amounts of PDL (e.g., input artificially at PDL 1 and PDL 2 as shown in FIG. 7A). For example, FIG. 7C shows a chart of results with artificial PDL inputs at PDL 1 and PDL 2 as shown in the experimental setup of FIG. 7A.

In certain interferometric cancellers, numerous optical components are cascaded in the amplified leg to extract the channel-of-interest and precisely control power, delay, phase and state-of-polarization (SOP) in order to impart destructive interference (i.e. cancellation) at the output of the closing coupler. Each component may exhibit polarization dependent loss (PDL) or gain, producing a total PDL for the amplified leg that can limit cancellation performance. This is particularly true for modem 100G signals (e.g. dual polarization quadrature phase-shift keying (DP-QPSK)), where the normal tracking loops of the interferometer cannot mitigate the impact. Embodiments can automatically adapt to completely eliminate the total PDL in the amplified leg, for example.

Embodiments can reduce and/or remove PDL as a potential performance limitation. Embodiments can enable a wider range of acceptable components for use in an interferometer instead of having to use low PDL (expensive and difficult to produce) devices. In certain applications, PDL is a key component spec that could eliminate otherwise viable candidates for usable parts. Embodiments can ease manufacturing constraints of parts screening for lowest PDL. Traditional systems, for example, certainly cannot correct PDL effects on DP-QPSK. However, embodiments of this disclosure can completely mitigate the impact of PDL on DP-QPSK.

Embodiments can automatically determine, track, and correct the net PDL in the amplified leg of an optical system (e.g., a Mach-Zehnder Interferometer (MZI)), thereby enabling higher performance. Embodiments can utilize a second polarization controller and variable PDL emulator to supplement the components in the amplified leg of the MZI, for example. Through a carefully orchestrated acquisition process, the second polarization controller can align the composite PDL vector with the polarization beam splitter (PBS) inside the PDL emulator and the emulator rebalances the power in the two SOPs, thereby compensating for the PDL arising from other components. Embodiments can continue to track and compensate as the PDL angle and magnitude vary over time, thus providing a general solution to the PDL problem applicable even to DP-QPSK signal types.

In embodiments, two independent polarization controllers have to perform separate tasks on the same optical path. The first polarization controller can force the amplified leg to have the same polarization rotation matrix as the pass-through leg. Then, the second polarization controller can adapt to align the PDL vector with the emulator, for example. But, in so doing, the rotation matrix changes and the first polarization controller can then correct for that. Hence, embodiments can utilize an initial search and tracking scheme using feedback and different control schemes for the first and second polarization controllers.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A polarization dependent loss (PDL) compensation device for an optical system, wherein the PDL compensation device is configured to output a compensating PDL to at least partially cancel a PDL of the optical system wherein the device comprises:
   a first polarization controller configured to modify a state of polarization of an optical signal;
   a PDL emulator disposed upstream of the first polarization controller and configured to output the compensating PDL upstream of the first polarization controller; and
   a second polarization controller disposed upstream of the PDL emulator and configured to modify a state of polarization of the optical signal upstream of the PDL emulator.

2. The device of claim 1, further comprising a control module configured to control the first polarization controller, the PDL emulator, and the second polarization controller to reduce PDL downstream of the first polarization controller.

3. The device of claim 2, wherein the control module is configured to receive feedback of an optical output power from downstream of an interference coupler and to control the first polarization controller, the PDL emulator, and the second polarization controller to reduce and/or minimize the optical output power.

4. The device of claim 2, wherein the control module is configured to modify an amount of compensating PDL output by the PDL emulator after refining settings for the second polarization controller that cause PDL cancellation.

5. The device of claim 2, wherein the PDL emulator includes:
   a polarizing beam splitter optically connected to the second polarization controller at an input side of the polarizing beam splitter (PBS) to split the optical signal from the second polarization controller;
   a bypass line optically connected to a first output of the PBS;
   a variable optical attenuator (VOA) optically connected to a second output of the PBS configured to create a variable PDL; and
   a polarizing beam combiner (PBC) optically connected at a first input thereof to the bypass line and at a second input thereof to the VOA to combine optical signals therefrom to output a compensated optical signal, wherein the PBC is optically connected to the first polarization controller.

6. The device of claim 5, wherein the VOA is configured to output PDL as a function of voltage, wherein the control module is configured to control voltage to the VOA.

7. The device of claim 6, wherein the control module is configured to:

adjust the first polarization controller to match the polarization rotation matrices of the pass-through leg and an amplified leg of an optical system;

perform a directed search using the second polarization controller to optimize polarization state of the PDL emulator to reduce PDL; and further adjust the first polarization controller to correct polarization orientation at an output of the amplified leg due to a change introduced by adapting the second polarization controller.

8. The device of claim 7, wherein the control module is configured to:

set an initial compensating PDL output amount after adjusting the first polarization controller to match the polarization rotation matrices; and adapt the first polarization controller, adapt the second polarization controller at a rate slower than that used for adapting the first polarization controller to find a polarization state that reduces total PDL of the amplified leg, and then modify the compensating PDL output amount.

9. An interferometer system, comprising:

a pass-through leg configured to transmit a first optical signal;

an amplified leg coupled to the pass-through leg to receive the first optical signal at a first end, and coupled to the pass-through leg at a second end to output a second optical signal to the pass-through leg to interfere with the first optical signal;

a polarization dependent loss (PDL) compensation device disposed on the amplified leg, wherein the PDL compensation device is configured to output a compensating PDL to at least partially cancel a PDL of the interferometer system, wherein the PDL compensation device comprises:

a first polarization controller configured to modify a state of polarization of an optical signal;

a PDL emulator disposed upstream of the first polarization controller and configured to output the compensating PDL upstream of the first polarization controller; and a second polarization controller disposed upstream of the PDL emulator and configured to modify a state of polarization of the optical signal upstream of the PDL emulator.

10. The system of claim 9, further comprising a control module configured to control the first polarization controller, the PDL emulator, and the second polarization controller to reduce PDL downstream of the first polarization controller.

11. The system of claim 10, wherein the control module is configured to receive feedback of an optical output power from downstream of an interference coupler and to control the first polarization controller, the PDL emulator, and the second polarization controller to reduce and/or minimize the optical output power.

12. The system of claim 11, wherein the control module is configured to modify an amount of compensating PDL output by the PDL emulator after refining settings for the second polarization controller that cause PDL cancellation.

13. The system of claim 11, wherein the PDL emulator includes:

a polarizing beam splitter optically connected to the second polarization controller at an input side of the polarizing beam splitter (PBS) to split the optical signal from the second polarization controller;

a bypass line optically connected to a first output of the PBS;

a variable optical attenuator (VOA) optically connected to a second output of the PBS configured to create a variable PDL; and a polarizing beam combiner (PBC) optically connected at a first input thereof to the bypass line and at a second input thereof to the VOA to combine optical signals therefrom to output a compensated optical signal, wherein the PBC is optically connected to the first polarization controller.

14. The system of claim 13, wherein the VOA is configured to output PDL as a function of voltage, wherein the control module is configured to control voltage to the VOA.

15. The system of claim 14, wherein the control module is configured to:

adjust the first polarization controller to match polarization rotation matrices of the pass-through leg and the amplified leg of an optical system;

perform a directed search using the second polarization controller to optimize polarization state of the PDL emulator to reduce PDL; and further adjust the first polarization controller to correct polarization orientation at an output of the amplified leg due to a change introduced by adapting the second polarization controller.

16. The system of claim 15, wherein the control module is configured to:

set an initial compensating PDL output amount after adjusting the first polarization controller to match the polarization rotation matrices; and adapt the first polarization controller, adapt the second polarization controller at a rate slower than that used for adapting the first polarization controller to find a polarization state that reduces total PDL of the amplified leg, and then modify the compensating PDL output amount.

17. A non-transitory computer readable medium comprising computer readable instructions that when executed by a computer causes the computer to perform a method, the method comprising:

controlling a PDL compensation device to output a compensating polarization dependent loss (PDL) to at least partially cancel a PDL of an optical system, wherein the PDL compensation device comprises:

a first polarization controller configured to modify a state of polarization of an optical signal;

a PDL emulator disposed upstream of the first polarization controller and configured to output the compensating PDL upstream of the first polarization controller; and a second polarization controller disposed upstream of the PDL emulator and configured to modify a state of polarization of the optical signal upstream of the PDL emulator.

18. The non-transitory computer readable medium of claim 17, wherein the method can further include:

using power output feedback to control the PDL compensation device to increase PDL cancellation.

* * * * *